Fig. 1a
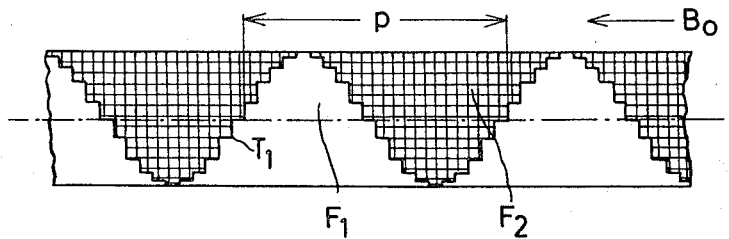
Fig. 1b
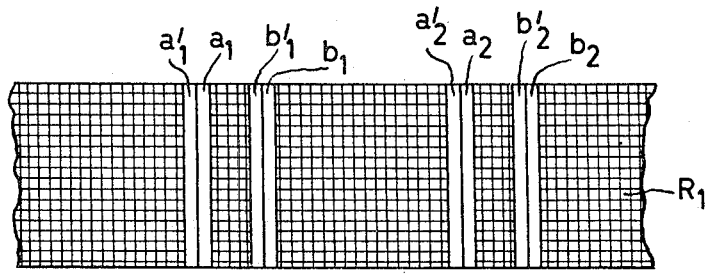
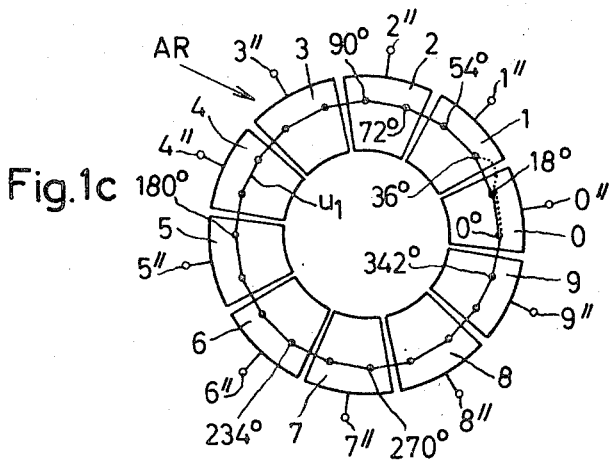
Fig. 1c

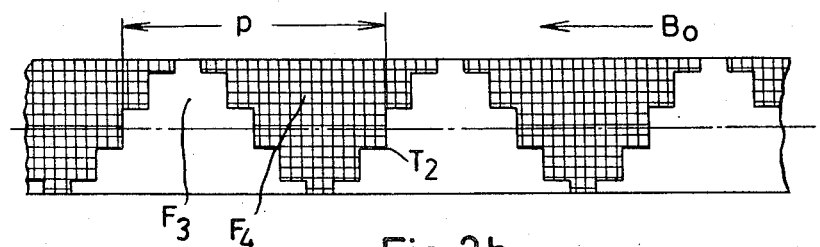
Fig. 2a
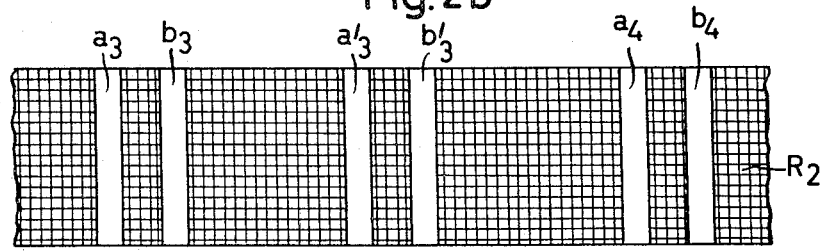
Fig. 2b
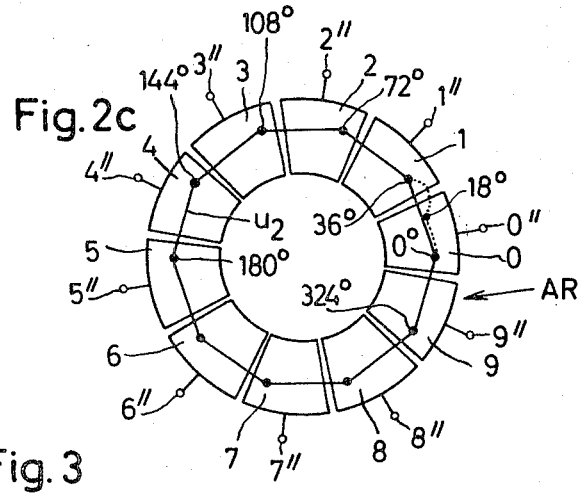
Fig. 2c
Fig. 3
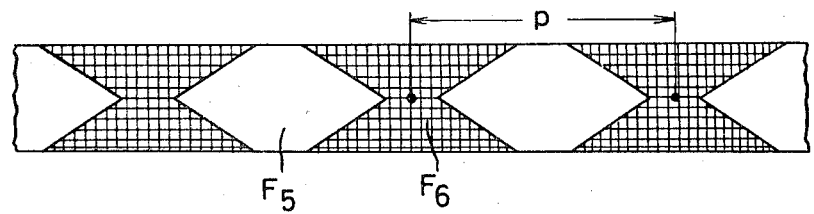

United States Patent Office 3,441,350
Patented Apr. 29, 1969

3,441,350
POSITIONING DEVICE FOR THE ABSOLUTE DIGITAL DETERMINATION OF MEASURING VALUES
Kurt Räntsch, Heidenheim (Brenz), and Otto Trötscher, Aalen, Germany, assignors to Carl Zeiss-Stiftung, doing business as Carl Zeiss, Heidenheim (Brenz), Wurttemberg, Germany, a corporation of Germany
Filed Jan. 11, 1966, Ser. No. 519,932
Claims priority, application Germany, Jan. 14, 1965, Z 11,275
Int. Cl. G01b 11/04
U.S. Cl. 356—170   13 Claims

ABSTRACT OF THE DISCLOSURE

A positioning device for the absolute digital determination of measuring values employing a scanning head and a measuring gauge relatively movable to said scanning head. For each decimal of the measuring value is generated a sequence of electrical signals of a predetermined periodic characteristic when said measuring gauge is scanned, and said sequence of signals is decimally coded after amplification in an electronic analog-digital transformer.

---

The invention relates to a device for the absolute digital determination of measuring values in distance measuring devices or in positioning devices provided with a measuring gauge relatively movable with respect to a scanning head.

The digital measuring value determination has been gaining increasing importance in the construction of numerically controlled machine tools as well as in the purely numerical indication of the actual value in machine tools.

It is known to arrive at digital measuring values by employing two different methods. The first method provides that the measuring instrument is based on some standard gauge which, for instance, has the form of a raster scale, the graduations of which are unnumbered. In performing a measurement or positioning with such a measuring system—called relative digital measuring method—the measuring value is obtained by adding up all increments in a counter. According to the second method, the so-called absolute digital measuring method, the measuring devices heretofore employed merely two binarily coded scales. Since the pure binary system is relatively difficult to convert into the decimal system, a mixed decimal-binary coding is preferred.

Whether the method used is purely binary or decimal-binary, the number of the tracks to be scanned on the scale is at any case considerable. If for instance five decimals are to be represented, this would require a dual scale having 17 tracks. The number of tracks is increased to 20 when the scanning of the same number of digits is to be done by the decimal-binary method.

When employing purely dual scales, there exist always certain insecurities in reading correctly the measuring value at all those points of the scale at which the transition from one number to another is effected by the simultaneous change of several dual places. In order to alleviate or prevent the possibility of any inaccuracies the so-called V-scaning is resorted to. In such an arrangement the finest binary line of the scale is associated with one scanning element and each further line is associated with two scanning elements which on purely dual scales are offset with respect to one another by one half of the raster constant of the respective dual places. The scanning elements of the finest line and in the same way the scanning elements of the following lines determine according to their information content O or L, which one of the scanning elements of the following lines is to be used for the accurate measuring value determiantion. In a purely binary measuring value processing of five decimals, which is e.g., done by optical means (2×17)−1=33 photoelectric receivers are necessary. The number of photoelectric receivers increases to (2×20)−1=39 when a decimal-binary coding is employed. There is also known a method for V-scanning which does require a smaller number of photoelectric receivers but which is encumbered by quite an involved electronic equipment.

All these known methods have the disadvantage that they require a considerable amount of equipment in the construction of the gauge and of the scanning head connected therewith as well as in the electric portion of the scanning mechanism.

It is the object of the invention to provide a device for an absolute digital measuring value processing, which permit a simple construction of the measuring scale and of the scanning head so that the entire equipment is economical.

According to the invention, during the scanning of the measuring gauge a series of analogous signals or signal pairs having a predetermined electrical function curve are generated per decimal of the measuring value, and the signal sequences of each decimal are, if necessary after photoelectric enlargement of the same, decimally coded in an electronic analog-digit transformer.

The scanning of the measuring gauge is effected at least partly photoelectrically, that is, the scanning in the lower decimals is performed by photoelectric means and in the higher decimals by mechanically operated electric signal emitters.

The desired function curve of the primary signals, for instance a sine curve, cosine curve, $sine^2$ curve or also a saw tooth curve, is at least approximately produced by a corresponding shaping of the symbols of the gauge or of the scanning elements in the scanning head.

It has been suggested heretofore in the inventors' copending application Serial No. 407,329, filed Oct. 29, 1964, and allowed May 21, 1968, now Patent No. 3,400,391, to generate optical sine-cosine signals, the cycle duration of which corresponds to one distance unit and which upon amplification of the optical signals cause the beam of an electron beam tube to move on a subdivided collecting raster along a closed path, as for instance a circle. In a 10-port raster consisting of separate raster elements, which are electrically projected individually from the tube, the orbit of the beam and therewith the associated distance unit is decimally coded. To utilize the same method of coding also for the greater decimals meets, however, with great difficulties, since it is technically extremely difficult to devise an optical signal emitter system in such a manner that the brightness curve also with large distance units of i.e. 1 mm., 10 mm., etc., is truly sine-shaped.

The present invention is based upon the assumption that in a decimal interpolation of the primary interval merely ten discrete positions are of interest so that it is not even necessary to have available a true sine-curve of the signal, but it rather suffices when (1) The electron beam comes to rest in steps which correspond each to one tenth of the signal cycle at the points of the receiving raster which it would occupy also with truly sine or cosine curved primary signals;

(2) The electron beam on its path from one step to the other does not leave the raster element.

In order to obtain likewise an unambiguous measuring value indication as in the initially mentioned binary systems, a criterion for the unequivocal tens conversion must be added to the two requirements specified above.

According to the invention the measuring device is made up for example in the lowest decimals (0.01 or 0.001 mm.) by true sine and cosine systems, respectively, which in such fine lines may be optically realized relatively simple from a raster scanning with a raster constant of 0.1 or 0.01 mm., for example by a suitable selection of the bar-gap proportion, while in the higher decimals the desired sine or cosine systems, respectively, may be realized for example from optically effective plane markings disposed substantially on the measuring gauge and whose boundary lines approximate the desired signal curve.

The traces for the higher decimals may, however, also be provided with optically effective gap-like markings, and the desired signal curve is obtained by a corresponding shaping of the photoelectric receiver or the masks arranged in front of it.

In another embodiment of the invention the tracks for the higher decimals are represented by a scanning rail having a profile that is changeable in the direction of scanning and corresponds to the desired signal shape.

Another kind of signal generating for the higher decimals uses cam bars energized by cam discs of the desired signal form which control the load of an electric signal emitter. For coding such signals the invention proposes to use electron beam tubes which contain at least a 10-part receiving raster. The arrangement of the raster elements according to the kind of signal fed into it (saw tooth or sine/cosine) may be along a straight or a circular line.

There are further provided electronic switch means which couple the movements of the electron beam in the individual electron beam coders in such a manner that the electron beams scan a number of times over parts of the total extension of the raster elements of the associated receiving raster and then leap over to the next following raster element the moment the electron beam of the coder associated with the next lower decimal changes between the raster elements corresponding to the code values 9 and 0.

For this purpose may for instance be used electromagnetic coils influencing the zero position of the electron orbits, which coils are connected to one of the raster groups of the receiving raster of the electron beam coder associated with the next lower decimal of the measuring value, said groups being separated by the transitions 9–0 and 4–5.

In another embodiment of the invention the scanning of the sign tracks for the higher decimals is effected by an optical projection of the measuring scale on optical rasters which are provided with at least one pair of gaps the individual gaps of which are offset to each other by $\frac{1}{20}$ of the cycle length of the scanned sign sequence. These gaps are associated with photoelectric receivers and the voltages emitted by these receivers are alternatingly fed, after amplification and with the assistance of a selection circuit controlled by the electron beam tube of the next higher decimal, to the deflection systems of the electron beam tube associated with the decimal just scanned.

The invention will be described in further detail with reference to the accompanying drawings, in which FIG. 1a illustrates diagrammatically one sign track in accordance with the invention;

FIG. 1b illustrates diagrammatically a raster for cooperation with the sign track of FIG. 1a;

FIG. 1c illustrates diagrammatically a receiving raster in an electron beam tube;

FIG. 2a illustrates diagrammatically another sign track in accordance with the invention;

FIG. 2b illustrates diagrammatically a raster for cooperation with the sign track of FIG. 2a;

FIG. 2c illustrates diagrammatically a receiving raster in an electron beam tube associated with the features of FIGS. 2a and 2b;

FIG. 3 illustrates still another sign track in accordance with the invention;

Figure 4:
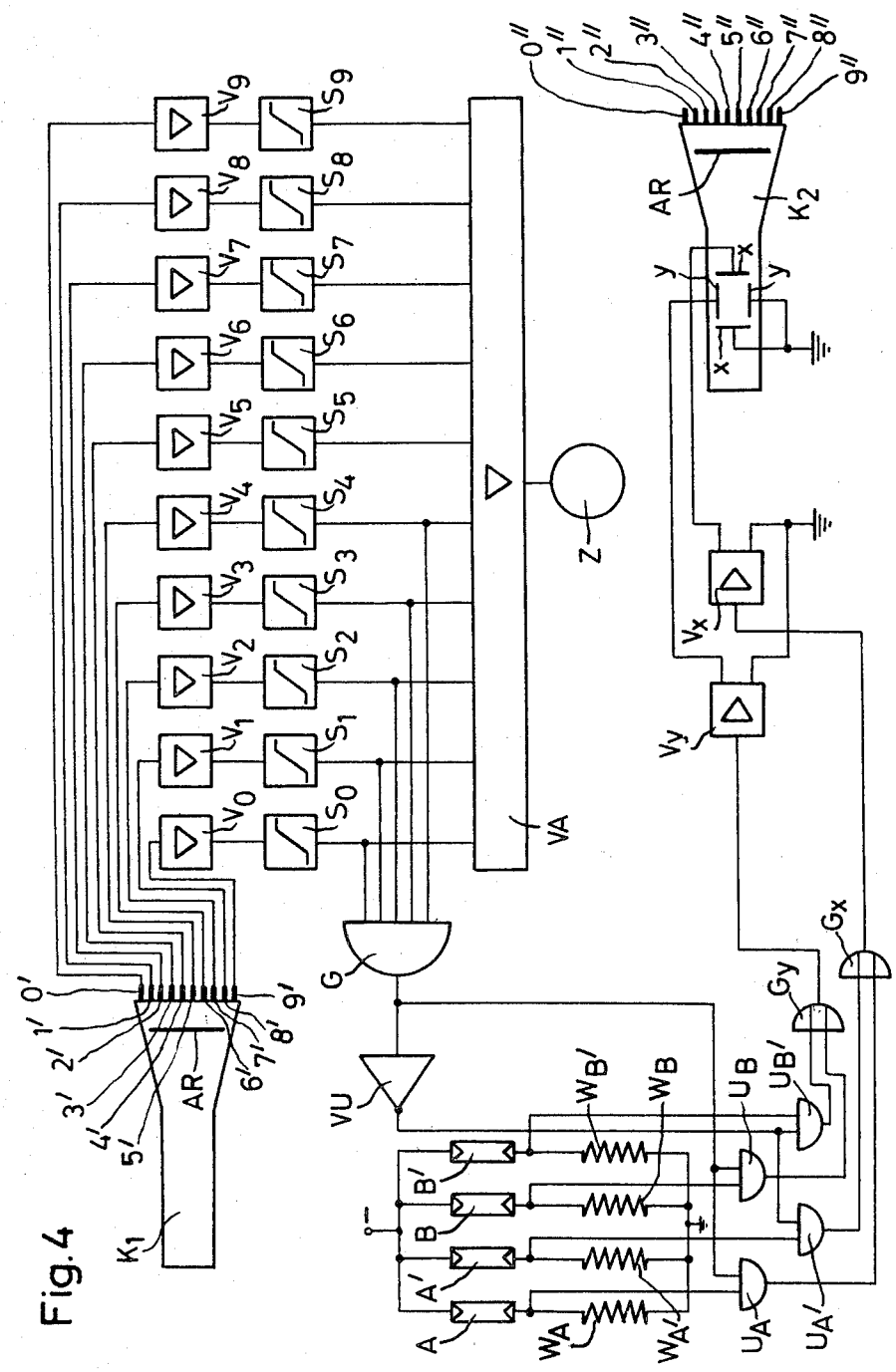
FIG. 4 illustrates a circuit diagram of one embodiment of the device of the invention.

Referring to the drawing, the FIGS. 1a, 2a and 3 illustrate sign sequences as they may be applied to the measuring scale for establishing the sign tracks for the higher decimals of the measuring value.

The sequences illustrated in the FIGS. 1a and 2a consist for instance of sign fields $F_1$, $F_2$ and $F_3$, $F_4$ respectively, which are made alternately light and dark or transparent and opaque and which are separated from each other by 20-step and 10-step boundary lines $T_1$ and $T_2$, respectively. These stairway-like boundary lines $T_1$, $T_2$ are so arranged that the area elements of the individual steps positioned beneath the boundary lines $T_1$, $T_2$ correspond to the areas of the ideal sine curve (or sine square curve, respectively) of the same cycle segment. The width of the steps in FIG. 1a is $\frac{1}{20}$ and in FIG. 2a $\frac{1}{10}$ of the cycle length $p$.

The embodiment of the sign sequence for the higher decimals illustrated in FIG. 3 contains the double-trapezoidal areas $F_5$, $F_6$, which may be made optically contrary effective, like for example $F_1$, $F_2$, $F_3$ and $F_4$.

In optically constructed scales, a part of the scale, e.g. one cycle, is projected by way of optical means not illustrated onto optical rasters $R_1$, $R_2$ which may be constructed as illustrated in the FIGS. 1b and 2b. The rasters $R_1$ and $R_2$ are made of an opaque material and are provided with light transparent gaps of the width of a step of the associated sign track.

The center lines of the gaps $a_1$ and $a_2$, respectively, are so arranged that they scan the scale track (within the same cycle or the following ones) at places offset by one quarter of the respective cycle length $p$ with respect to the center lines of the associated gap $b_1$ and $b_2$ (FIG. 1b), and likewise, the same holds true for the gaps $a_3$ and $a_4$ with respect to the gaps $b_3$ and $b_4$ (FIG. 2b). This has the result that in a relative motion between measuring scale and scanning raster for example at the $a$-gaps an approximately sine-shaped signal is scanned and at the $b$-gaps an approximately cosine-shaped signal.

The gaps provided with a prime (e.g. $a'_1$) scan the scale at places which are offset by $\frac{1}{20}$ cycle length (within the same cycle or the following cycles) in contradistinction to the unprimed gaps (e.g. $a_1$). The meaning and operation of these gaps will still be further explained hereinafter.

For scanning the sign track according to FIG. 3 a raster of the form $R_2$ illustrated in FIG. 2b may be used.

If now at a relative motion of sign track and raster the raster gap is scanned by photoelectric receivers, whereby the gaps $a_1$, $a_2$ and $b_1$, $b_2$ (FIG. 1b) are preferably held together by light conducting means, and if one applies the voltages which are emitted by these photoelectric receivers and which are phase displaced by 90° with respect to each other in known manner to the crossing deflecting systems of an electron beam tube, then the electron beam performs the 20-cornered circular path $u_1$ (FIG. 1c), thereby scanning a ten-part receiving raster AR provided with the elements 0–9. With 0″–9″ are designated the electric outputs of the raster.

FIG. 2c shows a ten-cornered circular path $u_2$ of the electron beam generated in similar manner as $u_1$, when the electron beam scans the sign track according to FIG. 2a. All raster elements 0–9 are electrically insulated and are individually connected to the ten separate outputs 0″–9″ of the electron beam tube, which in turn are connected to suitable indication means, as for instance a number tube.

If it is desired to simultaneously cover several decades of the measuring value by arranging several of these assemblies one next to the other, care must be taken that at any time the measuring value indication leaves no doubt as to its position. Therefore it must be made sure that by a suitable circuit in the transitions from one element of the receiving raster (see FIG. 1c and FIG. 2c) to the other the contact lines of the raster elements are suppressed, or in other words, that in the electronic coder the electron beam is allowed to travel from one raster element to the next only then when in the coder of the preceding decimal a number change 0–9 or 9–0 has taken place.

It is a further object of the invention to take advantage of the fact that the accuracy of the primary signals may decrease with increasing decimal places.

For this purpose the invention provides that the raster elements of the receiving raster, whose width in the ideal case corresponds nearly to an interpolation interval of 36° ($=\frac{1}{10}$ of the primary signal when the signal cycle of the primary signal corresponds to a circular path of the electron beam of 360°), are only used over a width of 18° so that the difference will be ±9° which would amount to ¼ of the interpolation step.

Figure 5:
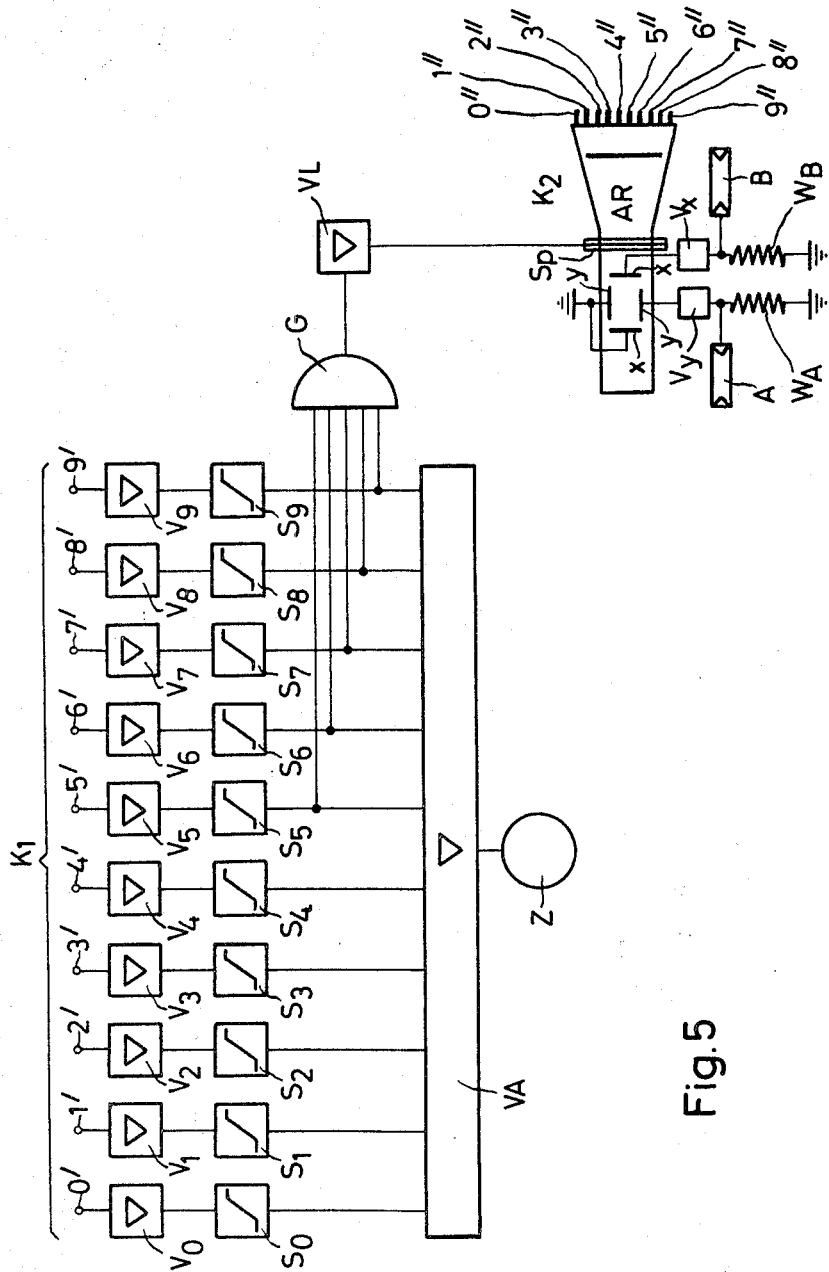
FIG. 5 illustrates a circuit diagram of another embodiment of a device of the invention.

The FIGS. 4 and 5 illustrate constructional examples of circuit arrangements which meet the aforementioned requirements.

In FIG. 4 the electron beam coder of the finest scale track (lowest decimal) is designated with $K_1$; it codes decimally with the aid of an electron beam travelling over a ten-part receiving raster the sine and cosine signals generated in known manner by, for instance, a raster-shaped track. With 0′, 1′ . . . 9′ are designated the outputs of this electron beam tube connected to the individual raster elements of the receiving raster. These outputs control an indication tube Z by way of the amplifiers $V_0, V_1 \ldots V_9$, the Schmitt triggers $S_0, S_1 \ldots S_9$ and an amplifier stage $V_A$. Parallel thereto and together with the Schmitt triggers $S_0$ to $S_4$ via an Or-gate G are provided the And-gates $U_A$ and $U_B$, and the And-gates $U'_A$ and $U'_B$ are arranged by way of the inverse stage VU. The photo voltages taken from the work resistances $W_A$, $W_B$ and $W'_A$, $W'_B$ respectively by the photoelectric receivers A, B and A′, B′ respectively, when scanning the gaps $a$, $b$ and $a'$, $b'$ (see FIG. 1b or 2b), are also conducted to the And-gates $U_A$, $U_B$ and $U'_A$, $U'_B$ respectively. The And-gates $U_A$ and $U'_A$ by way of an Or-gate $G_X$ and the amplifier $V_x$ are connected to the horizontally effective deflecting plates X, and the And-gates $U_B$ and $U'_B$ by way of an Or-gate $G_y$ and the amplifier $V_y$ are connected to the vertically effective deflecting plates Y of the electron beam coder $K_2$ for the next higher decimal. For the sake of clarity the deflecting plates X, Y are drawn offset by 90° with respect to their actual position. The cycle lengths of the signals to be coded by the coders $K_1$ and $K_2$ are in a ratio of 1:10 in accordance with the scanned scale markings, which means that when the electron beam of the coder $K_1$ has completed one orbit, the electron beam of the coder $K_2$ has covered only $\frac{1}{10}$ of its orbit.

The operation of this circuit arrangement is as follows:

As long as the electron beam of the coder $K_1$ during the counting of 0, 1, 2, 3, 4 remains in the upper half of its circular path and therewith acts upon one of the outputs 0′ to 4′, the Or-gate is connected to the potential L and the And-gates $U_A$ and $U_B$ are made ready, while the And-gates $U'_A$ and $U'_B$ remain blocked on account of the interposed reversing stage VU so that merely the photoelectric receivers A and B scanning the gaps $a$, $b$ (FIGS. 1b and 2b) can act on the deflection plates of the coder $K_2$.

If therefore the electron beam in the coder $K_1$ travels from its starting position 0 a distance of 180°, whereby it acts on the outputs 0′ to 4′, the electron beam of the coder $K_2$ travels from 0 to 18°. If now the electron beam of the coder $K_1$ during counting of 5, 6, 7, 8, 9 moves into the second half of its circular path, thus acting only on the outputs 5′ to 9′, the Or-gate is in the stage 0 and the And-gates $U_A$ and $U_B$ are not made ready any more. Now the And-gates $U'_A$ and $U'_B$ are made ready by way of the reversing stage VU so that the photoelectric receivers A′, B′ scanning the gaps $a'$, $b'$ (FIGS. 1b and 2b) act on the deflecting systems of the coder $K_2$.

Since the gaps $a'$, $b'$ are displaced by $\frac{1}{20}$ cycle length with respect to the gaps $a$, $b$, as is shown in the FIGS. 1b and 2b, which at a movement of the scale marking shown in FIG. 1a or 2a, respectively, in the direction of the arrow $B_0$ with respect to the receiving raster of FIG. 1b or 2b, resp., corresponds to a setback of the scanned place by $\frac{1}{20}$ cycle length and at a closed orbit of 360° corresponds to a back movement of the electron beam by 18°, the electron beam of the coder $K_2$ jumps on further displacement of the measuring scale, i.e. when the electron beam of the coder $K_1$ travels from the raster element 4 to 5, from its 18° position back into the zero position and thence travels on again to the position 18°.

If now the electron beam of the coder $K_1$ has completed an orbit or changes from the raster element 9 to the raster element 0 and therewith acts on the output 0′, again the photoelectric receivers A, B scanning the gaps $a$, $b$ are connected to the deflection systems of the coder $K_2$ and the electron beam of this coder leaps from the position of 18° over the raster contact point to the position of 36° and on to the following raster element, since the gaps $a$, $b$ meanwhile have been moved on. This alternating scanning of the photo electric receivers A, B to A′, B′ and vice versa is correspondingly repeated at further displacing the measuring scale markings, whereby the electron beam of the coder $K_2$ upon traversing twice a part of each raster element jumps on to the next raster element.

The same result is achieved in a relatively simple manner with the circuit illustrated in FIG. 5. Elements identical with those used in the circuit according to FIG. 4 are designated with the same reference characters.

In the circuit according to FIG. 5 the outputs 5′, 6′, 7′, 8′ and 9′ of the coder $K_1$ are connected to an annular coil $Sp$ by way of an Or-gate G and a power amplifier VL; the annular coil $Sp$ is in known manner so arranged that in its energized condition it is able to displace the zero position of the electron orbit. The power amplifier VL and the coil $Sp$ are so dimensioned that when the outputs 5′ and 9′ of the coder $K_1$ are acted upon, the zero position of the electron beam orbit of the coder $K_2$ is rotated by 18° counterclockwise to the direction of counting. When such a circuit is used, the scanning gaps $a'$ and $b'$, respectively (see FIGS. 1b and 2b) may be dispensed with, because then a scanning displaced by merely one quarter cycle length through the gaps $a$, $b$ and the associated photoelectric receivers A, B is necessary for producing the electron orbit.

In the circuits according to the FIGS. 4 and 5 the described procedures take place in the reverse direction when the counting is done by way of subtraction (reverse direction of movement of the measuring scale and of the electron beams).

It is apparent that the described control procedures continue over all decades when between the coders of each decimal a circuit is arranged as it is illustrated in the FIGS. 4 or 5. Then it is only necessary to interpose a trigger between the coders of the first and of the second decimal ($K_1$ and $K_2$) because at the outputs 0″ to 9″ of the coder $K_2$ step-like voltage variations occur in consequence of the described switching procedure.

Figure 6:
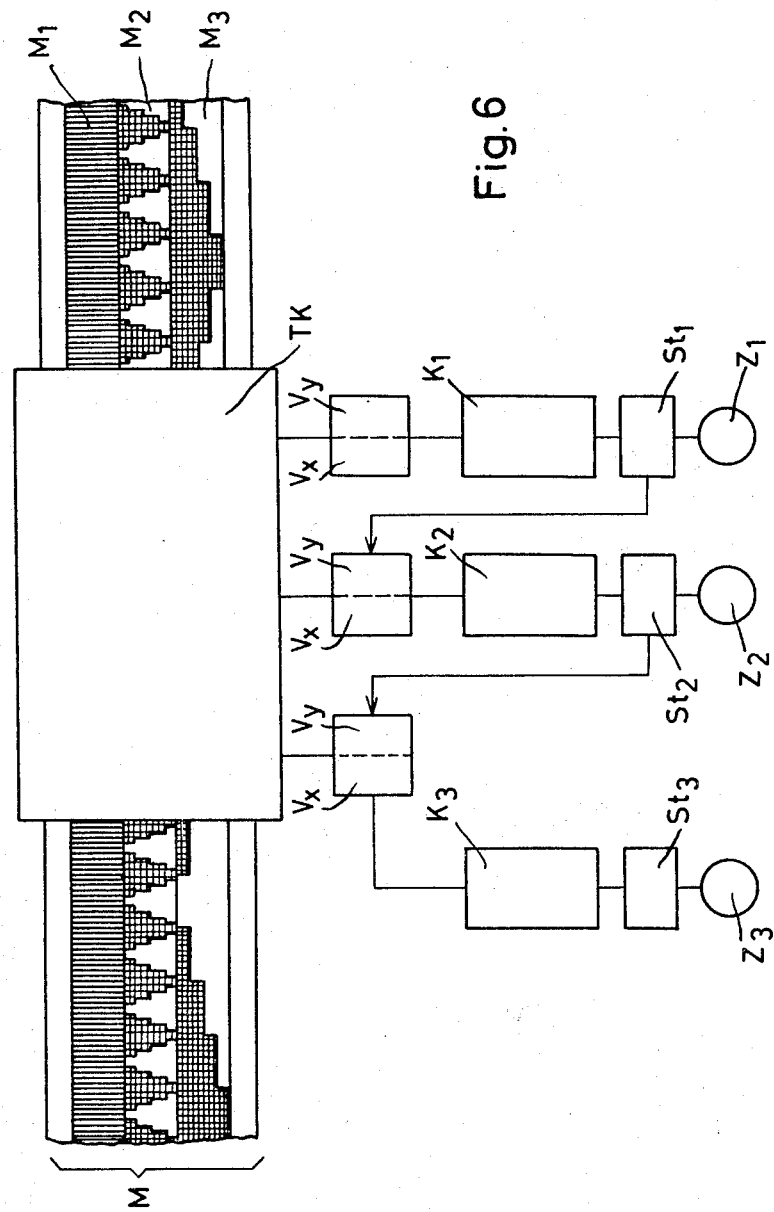
FIG. 6 illustrates diagrammatically a complete structure of one embodiment of the invention.

FIG. 6 illustrates the complete structure of a device according to the invention for an absolute-digital representation of three decimals, for example 0.01 mm., 0.1 mm. and 1 mm., of a transposition path.

The device consists of a three-lane scale M on which is arranged for the lowest decimal a raster scale $M_1$ having a raster constant of e.g. 0.1 mm. The two step scales $M_2$ and $M_3$ represent the standard gauge for the next two decimals and show a ten-step marking, as illustrated in FIG. 2a.

The ratio of the cycle lengths of the markings $M_1$, $M_2$, $M_3$ is 1:10:100, i.e., one cycle of the marking $M_3$ corresponds to 10 cycles of the marking $M_2$ and 100 cycles of the marking $M_1$.

The scanning head TK for the purpose of scanning the track $M_1$ is provided with at least two scanning members offset by ¼ cycle length, which generate sine and cosine signals. The scanning of the tracks $M_2$, $M_3$ may be carried out in the same way as described with reference to the FIGS. 1b and 2b, but also here only two scanning members offset by ¼ of the cycle length are required when the electron beam of the coders is controlled by way of coils (Sp in FIG. 5).

The photo voltages supplied by the scanning head TK are amplified by the amplifiers $V_x$, $V_y$ whose output signals control the associated electron beam coders $K_1$, $K_2$ and $K_3$.

The ten output signals of these coders are further processed by way of the control devices $St_1$, $St_2$, $St_3$ (which correspond to the circuits illustrated in FIGS. 4 or 5) in such a manner that they are able to act upon the number tubes $Z_1$, $Z_2$, $Z_3$ and otherwise permit a decision about an accurate decimal transposition. It is obvious that the number of decimal places capable of being covered by such a device may easily be increased by putting together several "step rulers" or sign tracks which for each further decimal have a coarser graduation.

Figure 7:
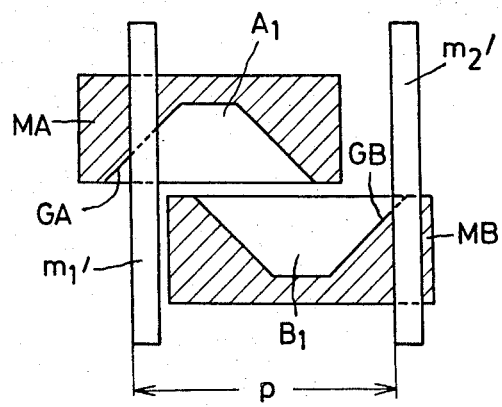
FIG. 7 illustrates diagrammatically a modification of the use of the gap images in connection with photoelectric receivers.

The method of photoelectrically generating signals as described heretofore in connection with constructional examples may be reversed in that the tracks of the standard gauge are provided with bright, gap-like markings and are projected by optical means onto special photoelectric receivers disposed in the scanning head. This is illustrated schematically in FIG. 7. The images of two of these gauge gaps following each other at a distance p, i.e., at the cycle length corresponding to the decimal to be represented, are designated with $m'_1$ and $m'_2$. The width of the gaps is for instance ⅒ or ¹⁄₂₀ p. The photoelectric receivers $A_1$ and $B_1$, respectively, are electrically separated from each other and are displaced by ¼ of a cycle length with respect to each other and are either provided themselves with a boundary $G_A$ and $G_B$ corresponding to the desired signal form or this boundary is provided by masks $M_A$ and $M_B$ arranged in front of said photoelectric receivers $A_1$ and $B_1$.

Figure 8:
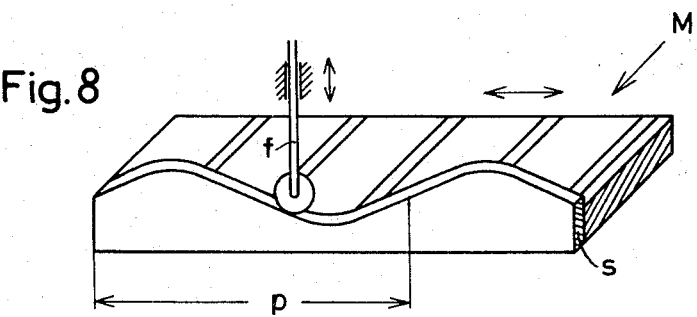
FIG. 8 illustrates diagrammatically the employment of an electromechanical scanning device.

Furthermore, the primary signals desired for the higher decimals may be obtained by an electromechanical scanning. For this purpose the respective track of the gauge M is, for example, provided with a profile rail s as schematically shown in FIG. 8, which rail in the direction of scanning, i.e. vertically to the direction of motion of the gauge, is provided with a profile suitable to create the desired signal form. A scanner f kept in contact with this profile may then control in known manner for instance the slide contact of a potentiometer of an electrical signal emitter.

Figure 9:
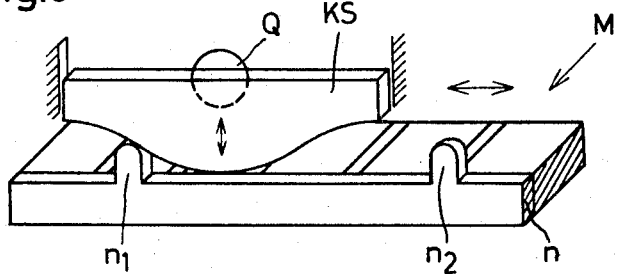
FIG. 9 illustrates diagrammatically another modification of an electro-mechanical scanning device.

The track of the gauge M for the higher decimals may also consist, as schematically illustrated in FIG. 9, of a cam bar n, the cams $n_1$, $n_2$ ... of which are arranged at a cycle distance p and are engaged by a cam disc KS whose shape corresponds to the desired signal curve. The cam disc KS in turn opens more or less a light passage symbolized here merely by a light source Q and therewith modulates the flow of light passing to a photoelectric receiver (not shown).

The various signal generating systems may, of course, be combined in the different tracks of a measuring gauge or in a suitably equipped scanning head, respectively. It is, however, of advantage to scan the lower decimals by photoelectric means and the higher decimals by electromechanical means.

The devices illustrated and described are merely constructional examples of the concept of the invention and may be varied in many ways within the scope of the invention. The invention is further not limited to a linear measuring gauge, but there may also be used a circular instrument provided with the required sign tracks.

What we claim is:

1. A device for performing an absolute digital determination of measuring values in distance measuring devices and in workpiece positioning devices, including a scanning head and a measuring gauge relatively movable to said scanning head, said measuring gauge being provided for each decimal of the measuring value with a single sign track having periodically recurring signs, said signs being decimally stepped from track to track and being so shaped that together with scanning elements of said scanning head they produce a sine shaped signal, electron beam tubes containing at least a ten-part receiving raster for coding said signals, and means for accurately conveying the decimal conversion over a range of several decimals.

2. A device according to claim 1, in which said measuring gauge is provided in its tracks for the high decimals with optically effective plane markings whose boundary lines approximate the desired signal curve, and means for scanning said markings photoelectrically by way of slit diaphragms.

3. A device according to claim 1, in which said measuring gauge is provided in its tracks for the high decimals with optically effective slit-like markings, and that associated photoelectric receivers arranged in said scanning head have a shape that corresponds to the desired signal curve or have arranged in front of them masks corresponding to said signal curves.

4. A device according to claim 1, in which said tracks for the high decimals are represented by a scanning bar having a profile which is variable in the scanning direction and which corresponds to the desired signal form, said scanning bar being in contact with the scanning member of an electric signal emitter.

5. A device according to claim 1, in which said measuring gauge for the tracks of the high decimals consists of cam bars which are engaged by cam discs of the scanning head said cam bars corresponding to the desired signal form and controlling the energization of an electric signal emiter.

6. A device according to claim 1, including electronic circuit means which synchronize the movements of the electron beams of the individual electron beam coders, said electronic circuit means including coupling means for causing said electron beams to travel several times over at least a part of a number of raster elements of associated receiving rasters and leap to the next following raster element as soon as the electron beam of that coder which is associated with he next following low decimal of the measuring value changes to the raster elements corresponding to the code values 9 and 0.

7. A device according to claim 6, in which electromagnetically effective coils are used in the zero position of the electron orbit, said coils being connected to one of the raster groups of the receiving raster of the electron beam coder associated with the next following low decimal, said raster groups being separated from each other by transitions 9–0 and 4–5.

8. A device according to claim 6, including means for the scanning of sign tracks for the high decimals, said means comprising an optical projection of the measuring scale onto optical rasters which are provided with at least one pair of gaps, the individual gaps being displaced with respect to each other by ¹⁄₂₀ of the cycle length of the scanned sign sequence, said gaps being associated with photoelectric receivers, the voltages emitted by said photoelectric receivers upon amplification and with the assistance of a selector circuit controlled by the electron beam tube of the next lower decimal being alternately transferred to the deflecting systems of an electron beam tube associated with the scanned decimal.

9. A device according to claim 8, including electron beam tubes which are provided with an electron beam travelling along a closed orbit and with at least one receiving raster concentrically arranged about the axis of said tubes.

10. Positioning device for the absolute digital determination of measuring values with a scanning head and a measuring gauge relatively movable to said scanning head, including means for causing a scanning of said measuring gauge by said scanning head, means for generating for each decimal of the measuring value a sequence of electrical signals of a predetermined periodic function curve when scanning said measuring gauge, an electronic analog-digital transformer, and means for decimally coding said signal sequences of each decimal after electric amplification of the same in said electronic analog-digital transformer.

11. A device according to claim 10, including a mechanically operated electric signal emitter for photoelectrically scanning the measuring gauge in the low decimals and in the high decimals.

12. A device according to claim 10, in which the function curve of the signals is predominantly produced by the shape of prearranged signs on the measuring gauge.

13. A device according to claim 10, in which the function curve of the signals is predominantly produced by the shape of scanning elements disposed in said scanning head.

References Cited

UNITED STATES PATENTS

| | | | |
|---|---|---|---|
| 2,781,171 | 2/1957 | Hagen | 315—21 X |
| 2,880,512 | 4/1959 | Fenemore et al. | 250—237 X |
| 2,957,104 | 10/1960 | Roppel | 315—8.5 |
| 3,037,420 | 6/1962 | Stade | 250—237 X |
| 3,077,815 | 2/1963 | Coakley. | |
| 3,230,827 | 1/1966 | De Neergaard | 350—272 |
| 3,285,123 | 11/1966 | Räntsch et al. | |

JAMES W. LAWRENCE, *Primary Examiner.*

V. LAFRANCHI, *Assistant Examiner.*

U.S. Cl. X.R.

250—219, 237; 313—73; 315—8.6, 9, 21; 328—94; 340—347